(12) United States Patent
Park et al.

(10) Patent No.: US 11,276,863 B2
(45) Date of Patent: Mar. 15, 2022

(54) GAS DIFFUSION LAYER FOR FUEL CELL AND METHOD FOR MANUFACTURING THE SAME

(71) Applicants: HYUNDAI MOTOR COMPANY, Seoul (KR); KIA MOTORS CORPORATION, Seoul (KR)

(72) Inventors: Jae Man Park, Yongin-si (KR); Seung Tak Noh, Suwon-si (KR); Ji Han Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 140 days.

(21) Appl. No.: 16/884,415

(22) Filed: May 27, 2020

(65) Prior Publication Data
US 2021/0184223 A1    Jun. 17, 2021

(30) Foreign Application Priority Data
Dec. 12, 2019 (KR) .................. 10-2019-0166034

(51) Int. Cl.
*H01M 4/86* (2006.01)
*H01M 4/88* (2006.01)
(Continued)

(52) U.S. Cl.
CPC ....... *H01M 4/8807* (2013.01); *H01M 4/8657* (2013.01); *H01M 8/0234* (2013.01);
(Continued)

(58) Field of Classification Search
None
See application file for complete search history.

(56) References Cited

U.S. PATENT DOCUMENTS 5,460,705 A * 10/1995 Murphy ............. H01M 8/1007
204/252
5,561,000 A * 10/1996 Dirven ............... H01M 4/8807
429/481
(Continued)

FOREIGN PATENT DOCUMENTS

JP 2010-267539 A 11/2010
KR 20090067262 A * 6/2009
KR 10-1730303 B1 4/2017

OTHER PUBLICATIONS

KR20090067262A—machine translation (Year: 2009).*

*Primary Examiner* — Haroon S. Sheikh
(74) *Attorney, Agent, or Firm* — McDonnell Boehnen Hulbert & Berghoff LLP (57) ABSTRACT

Disclosed is a gas diffusion layer for a fuel cell that may be made thinner by integrally forming a base and a fine pore layer, and a method for manufacturing the same. A gas diffusion layer for a fuel cell which constitutes a unit cell of the fuel cell includes: a base layer formed by impregnating a first slurry, in which carbon powder and polytetrafluoroethylene (PTFE) are mixed, in the interior of a carbon fiber base; and a fine pore layer formed by coating a second slurry, in which carbon powder and polytetrafluoroethylene (PTFE) are mixed and which has a viscosity that is higher than the viscosity of the first slurry, on a surface of the base layer.

16 Claims, 8 Drawing Sheets

(51) Int. Cl.
 *H01M 8/0234* (2016.01)
 *H01M 8/0239* (2016.01)
 *H01M 8/0243* (2016.01)
 *H01M 8/0245* (2016.01)
 *H01M 8/0662* (2016.01)

(52) U.S. Cl.
 CPC ....... *H01M 8/0239* (2013.01); *H01M 8/0243* (2013.01); *H01M 8/0245* (2013.01); *H01M 8/0662* (2013.01)

(56) References Cited

U.S. PATENT DOCUMENTS

| | | | | |
|---|---|---|---|---|
| 7,063,913 | B2* | 6/2006 | Ji ........................ | H01M 4/8657 |
| | | | | 429/465 |
| 8,133,306 | B2* | 3/2012 | Quayle ............... | H01M 8/0234 |
| | | | | 96/4 |
| 8,557,327 | B2* | 10/2013 | Hasegawa ........... | H01M 4/8821 |
| | | | | 427/115 |
| 2002/0041992 | A1* | 4/2002 | Zuber ................. | H01M 8/0239 |
| | | | | 429/481 |
| 2006/0078784 | A1* | 4/2006 | Liu ..................... | H01M 4/8828 |
| | | | | 429/480 |
| 2009/0011308 | A1* | 1/2009 | Lee ..................... | H01M 8/0234 |
| | | | | 429/479 |
| 2014/0329164 | A1* | 11/2014 | Utsunomiya ....... | H01M 4/8605 |
| | | | | 429/480 |
| 2016/0254550 | A1* | 9/2016 | Shibata ............... | H01M 4/8817 |
| | | | | 427/115 |
| 2017/0244107 | A1* | 8/2017 | Utsunomiya ....... | H01M 8/1007 |
| 2017/0250414 | A1* | 8/2017 | Boillat ................ | H01M 8/0239 |

* cited by examiner

FIG. 1

Prior Art

GAS DIFFUSION LAYER FOR FUEL CELL AND METHOD FOR MANUFACTURING THE SAME

CROSS REFERENCE TO RELATED APPLICATIONS

The present application claims priority to Korean Patent Application No. 10-2019-0166034, filed Dec. 12, 2019, the entire contents of which is incorporated herein for all purposes by this reference.

BACKGROUND

1. Field

The present disclosure relates to a gas diffusion layer for a fuel cell and a method for manufacturing the same, and more particularly, to a gas diffusion layer that may be made thinner by integrally forming a base and a fine pore layer, and a method for manufacturing the same.

2. Description of the Prior Art

A fuel cell is a kind of a power generation device that converts chemical energy of a fuel into electrical energy by using electrochemical reactions in a stack, and can not only supply driving power for the industries, homes, and vehicles but also be used to supply electric power to portable devices and small-sized electronic products, and the usage areas thereof has recently been increasing as a clean energy source of high efficiency.

Figure 1:
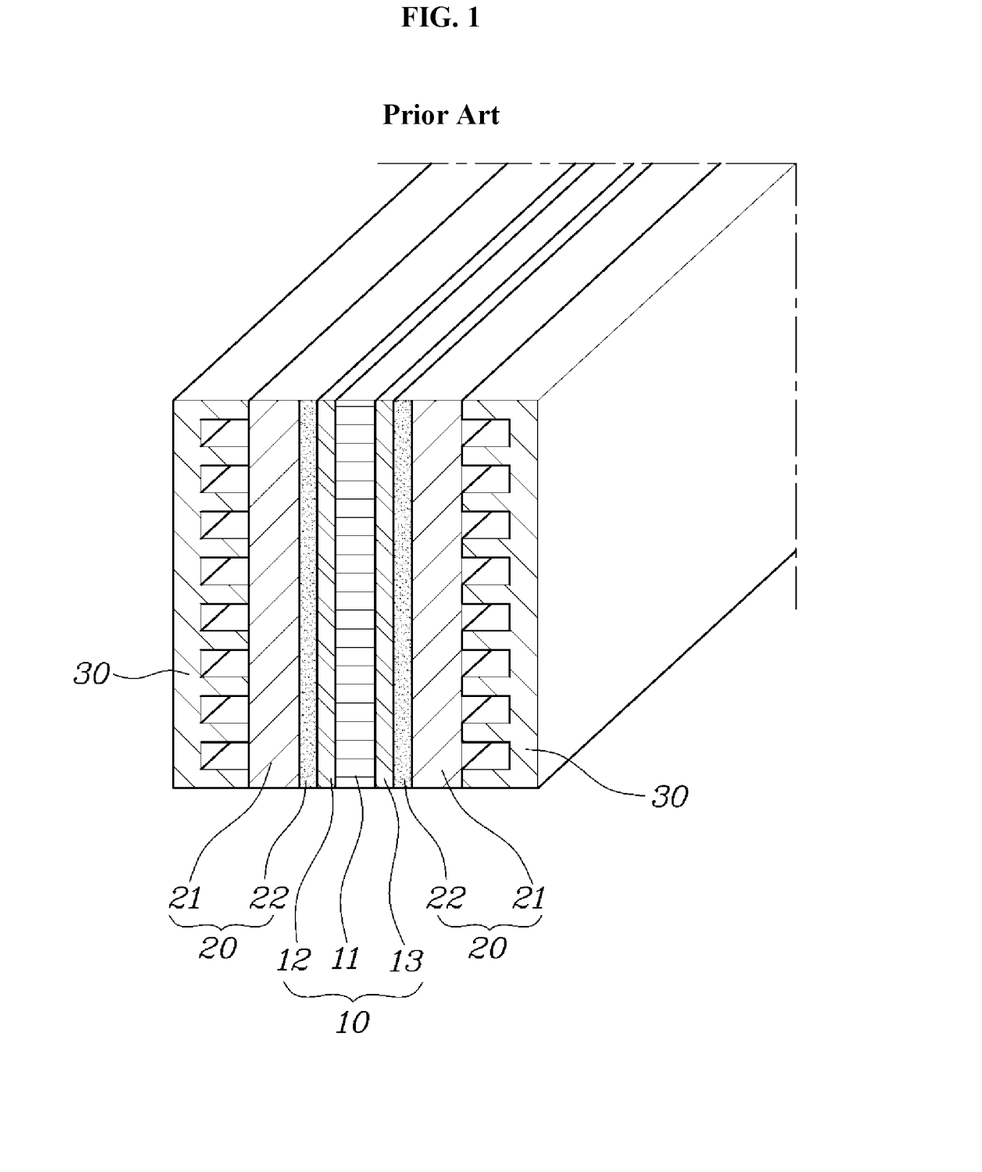
FIG. 1 is a view illustrating a unit cell of a fuel cell of the prior art.
Figure 2:
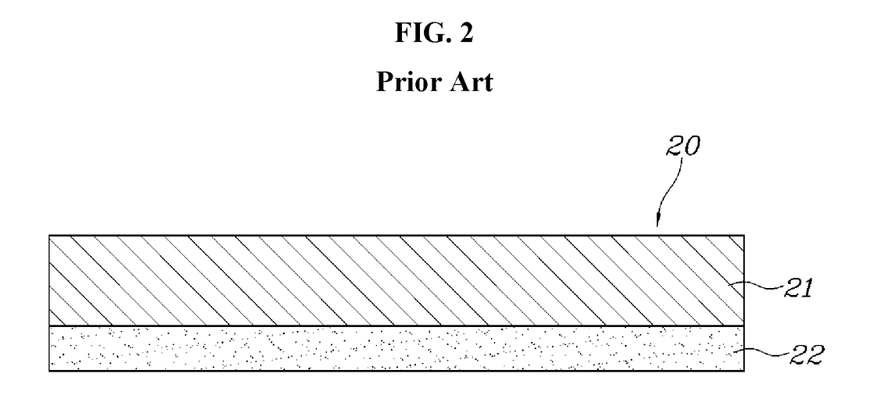
FIG. 2 is a cross-sectional view illustrating a gas diffusion layer of a general fuel cell of the prior art.

FIG. 1 is a view illustrating a unit cell of a general fuel cell. FIG. 2 is a cross-sectional view illustrating a gas diffusion layer of a general fuel cell.

As illustrated in FIG. 1, a membrane-electrode assembly (MEA) 10 is located on the innermost side of a unit cell of a general fuel cell, and the membrane-electrode assembly includes a polymeric electrolyte membrane 11 that may move hydrogen protons, and a catalytic layer applied on opposite surfaces of the electrolyte membrane such that hydrogen and oxygen may react each other, that is, a anode 12 and a cathode 13.

Further, a gas diffusion layer (GDL) 20 is laminated at an outer portion of the membrane-electrode assembly 10, that is, at an outer portion of the membrane-electrode assembly 10, at which the anode 12 and the cathode 13 are located, and a separator 30 that supplies a fuel to the outside of the gas diffusion layer 20 and has a flow field such that water generated by a reaction is discharged.

Then, the gas diffusion layer 20, as illustrated in FIG. 2, is formed by forming a fine pore layer (micro porous layer: MPL) in the base 21 including carbon fibers.

Further, the base 21 is generally formed by impregnating a hydrophobic agent such as polytetrafluoroethylene (PTFE) in carbon fibers, and for example, the carbon fibers may be the forms of carbon fiber cloth, carbon fiber felt, and carbon fiber paper.

Further, the finer pore layer 22 may be applied to one surface or opposite surfaces of the base 21 according to purposes after being manufactured by mixing carbon powder including carbon black, acetylene carbon black, and black pearl carbon and a hydrophobic agent such as polytetrafluoroethylene (PTFE).

Meanwhile, the anode electrode layer 12 generates protons and electrons through an oxidation reaction of hydrogen, and the protons and the electrons generated then move to the cathode 13 through the polymeric electrolyte membrane 11 and an electric wire, respectively, and the cathode electrode layer 13 generates water through an electrochemical reaction of protons and electrons moved from the anode 12, and oxygen in air and generates electric energy from the flows of the electrons at the same time.

Further, the vaporized reaction gas provided to the fuel cell and the liquefied water generated by the chemical reaction are discharged from the cathode 13 of the membrane-electrode assembly 10 while moving toward the fine pore layer 22, the base 21, and the separator 30 of the gas diffusion layer 20.

Meanwhile, studies for reducing a cell pitch (cell interval) to enhance the output density of a fuel cell stack, and accordingly, tries for making the thickness of single products that constitute the cell small are being continued.

For example, ways of making the thickness of the base, which functions as a base, on which the fine pore layer is coated, small to make the gas diffusion layer thin are being attempted.

In particular, recently, because a porous separator has been used to increase the diffusion performance of a reaction gas supplied to a cell and effectively discharge the generated water and the reaction gas is supplied through compulsory convection from the separator to the gas diffusion layer when the porous separator is used, the importance of the function of the base of the gas diffusion layer is reduced.

However, because the fine pore layer that constitutes the gas diffusion layer cannot define a layer by itself, it is difficult to delete the base to make the gas diffusion layer thin.

The items described as the background technologies are provided only for improvement of understanding of the background of the present disclosure, and should not be understood that it is admitted that the items correspond to the conventional technology that are known to those skilled in the art to which the present disclosure pertains.

SUMMARY

The present disclosure provides a gas diffusion layer for a fuel cell in which a base and a fine pore layer are integrally formed by impregnating slurry that forms the fine pore layer in the interior of the base, instead of deleting the base, to make the gas diffusion layer thin, and a method for manufacturing the same.

In accordance with an aspect of the present disclosure, a gas diffusion layer for a fuel cell which constitutes a unit cell of the fuel cell includes a base layer formed by impregnating a first slurry, in which carbon powder and polytetrafluoroethylene (PTFE) are mixed, in the interior of a carbon fiber base; and a fine pore layer formed by coating a second slurry, in which carbon powder and polytetrafluoroethylene (PTFE) are mixed and which has a viscosity that is higher than the viscosity of the first slurry, on a surface of the base layer.

The first slurry impregnated in the interior of the base layer may be impregnated in the entire area of the base layer.

The first slurry impregnated in the interior of the base layer may be impregnated in the interior of the base layer to have a predetermined pattern, and the pattern, in which the first slurry is impregnated in the base layer, is a pattern corresponding to a land formed in a separator that constitutes the unit cell of the fuel cell and an area of a channel, which faces the land.

The first slurry impregnated in the interior of the base layer may be impregnated in the entire area of the base layer, the predetermined pattern of the first slurry impregnated in the interior of the base layer may be classified into an over-density pattern in which the amount of the impregnated first slurry is relatively large and a low-density pattern in which the amount of the impregnated first slurry is relatively small when the first slurry is impregnated in the interior of the base layer, and the over-density pattern in the pattern, in which the first slurry is impregnated in the base layer, may be a pattern corresponding to a land formed in a separator that constitutes the unit cell of the fuel cell and an area of a channel, which faces the land.

The base layer may be classified into a high-density area, in which the amount of the impregnated first slurry is relatively large and a low-density area, in which the amount of the impregnated first slurry is relatively small with reference to the thickness direction thereof.

The gas diffusion layer for a fuel cell may be classified into a low-humidification gas diffusion layer and a high-humidification gas diffusion layer, the low-humidification gas diffusion layer may have the fine pore layer on a surface of the low-density area formed in the base layer, and the high-humidification gas diffusion layer may have the fine pore layer on a surface of the high-density area formed in the base layer.

The thickness of the base layer may be 50 µm to 80 µm, and the thickness of the fine pore layer may be 20 µm to 40 µm.

The solid content of the first slurry may be 5% to 10%, and the solid content of the second slurry may be 10% to 15%.

A cerium oxide may be further mixed in any one or both of the first slurry and the second slurry.

In accordance with an aspect of the present disclosure, there is provided a method for manufacturing a gas diffusion layer which constitutes a unit cell of the fuel cell, the method including a base preparing step of preparing a base by using carbon fibers; a slurry preparing step of preparing a first slurry, the viscosity of which is relatively low and a second slurry, the viscosity of which is relatively high, by mixing carbon powder and polytetrafluoroethylene (PTFE); a base layer forming step of forming a base layer by impregnating the first slurry in the interior of the base; and a fine pore layer forming step of forming a fine pore layer by coating the second slurry on a surface of the base layer.

The slurry preparing step may include preparing the first slurry by mixing carbon powder and polytetrafluoroethylene (PTFE) with a solvent such that the solid content of the first slurry is 5% to 10% whereby the viscosity of the first slurry is 10,000 cps to 100,000 cps; and preparing the second slurry by mixing carbon powder and polytetrafluoroethylene (PTFE) with a solvent such that the solid content of the second slurry is 10% to 15% whereby the viscosity of the second slurry is 100,000 cps to 500,000 cps.

The base preparing step may include preparing the base by using only the carbon fibers, and the base layer forming step includes: impregnating the first slurry in the entire area of the interior of the base by, after applying the first slurry on one surface of the base, suctioning the first slurry from an opposite surface of the base.

The base layer forming step may include forming the base layer such that the base layer is classified into a high-density area, in which the amount of the impregnated carbon powder is relatively large and a low-density area, in which the amount of the impregnated carbon powder is relatively small with reference to the thickness direction thereof, by adjusting the amount of the suctioned first slurry.

The gas diffusion layer for a fuel cell may be classified into a low-humidification gas diffusion layer and a high-humidification gas diffusion layer, the fine pore layer forming step may include when the low-humidification gas diffusion layer is manufactured, forming the fine pore layer by coating the second slurry on a surface of the low-density area formed in the base layer; and when the high-humidification gas diffusion layer is manufactured, forming the fine pore layer by coating the second slurry on a surface of the high-density area formed in the base layer.

The base preparing step may include preparing the base by using only the carbon fibers, the base layer forming step may include: after disposing a mask having a through-hole of a predetermined pattern on one surface of the base, applying the first slurry on the surface of the base, and impregnating the first slurry in the interior of the base in a predetermined pattern by suctioning the first slurry from an opposite surface of the base, and the predetermined pattern formed in the mask may be a pattern corresponding to a land formed in a separator that constitutes the unit cell of the fuel cell and an area of a channel, which face the land.

The method may further include after the fine pore layer forming step, a sintering step of sintering carbon powder and polytetrafluoroethylene (PTFE) included in the first slurry and the second slurry through heat treatment.

According to the embodiments of the present disclosure, because the base layer and the fine pore layer are integrally formed by impregnating the slurry that forms the fine pore layer in the interior of the base layer and coating the same or similar kinds of slurries on a surface of the base layer to form the fine pore layer, the strength of the gas diffusion layer can be maintained while the thickness of the gas diffusion layer is made thin.

Further, because the slurries including carbon powder is filled in the pores between the carbon fiber bases by impregnating the slurries including carbon powder in the interior of the carbon fiber base to form the base layer, the strength of the base layer itself can be easily secured, and the base layer and the fine pore layer can be prevented from being delaminated as the bonding force of the base layer and the fine pore layer is enhanced.

Further, carbon powder is further impregnated in the carbon fiber base that forms the base, a tremendous electrical conductivity of the gas diffusion layer can be secured.

Further, according to the present disclosure, generally, when the base layer is provided to form the gas diffusion layer, a process of separately impregnating PTFE in the carbon fiber base and performing a heat treatment can be omitted.

Further, because the slurries are impregnated with a predetermined pattern when the slurries are impregnated in the interior of the base layer, the discharge efficiency of the generated water can be adjusted.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, embodiments of the present disclosure will be described in detail with reference to the accompanying drawings. However, the present disclosure is not limited to the embodiments disclosed below and may be realized in various different forms, and the embodiments simply make the disclosure of the present disclosure complete and are provided to completely inform an ordinary person in the art of the scope of the present disclosure. In the drawings, the same reference numerals denote the same elements.

Figure 3:
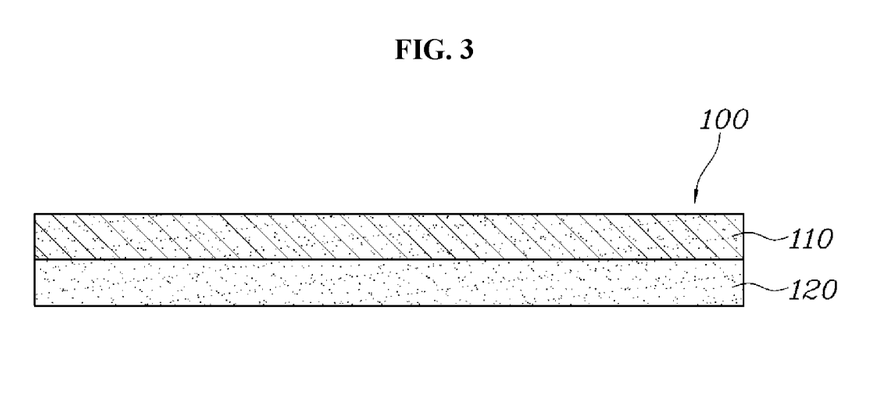
FIG. 3 is a cross-sectional view illustrating a gas diffusion layer for a fuel cell according to an embodiment of the present disclosure.
Figure 4:
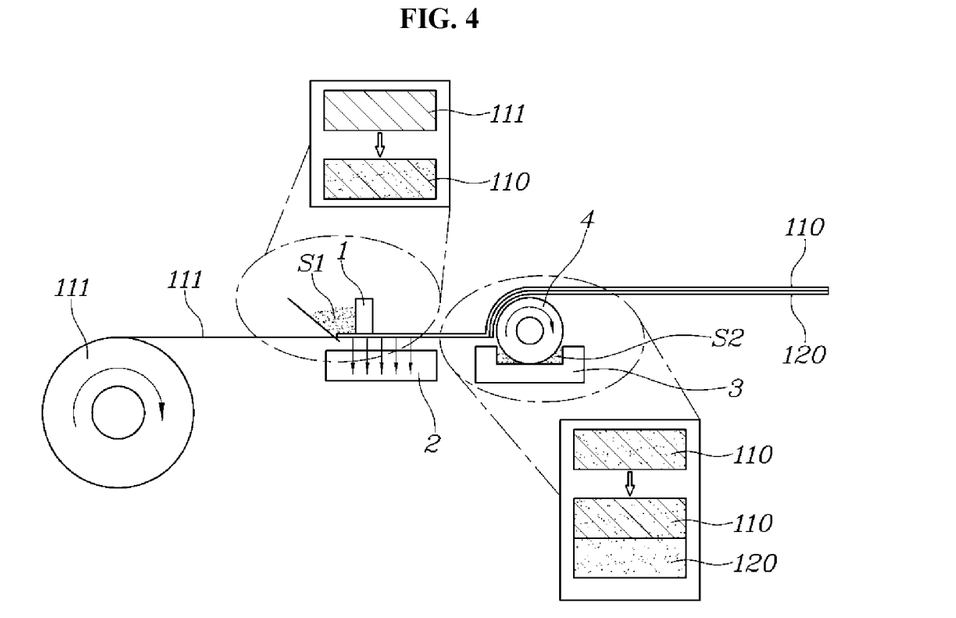
FIG. 4 is a view illustrating a process of manufacturing a gas diffusion layer for a fuel cell according to an embodiment of the present disclosure.

FIG. 3 is a cross-sectional view illustrating a gas diffusion layer for a fuel cell according to an embodiment of the present disclosure. FIG. 4 is a view illustrating a process of manufacturing a gas diffusion layer for a fuel cell according to an embodiment of the present disclosure.

As illustrated in the drawings, the gas diffusion layer 100 for a fuel cell according to the embodiment of the present disclosure includes a base layer 110 formed by impregnating a first slurry S1, in which carbon powder and polytetrafluoroethylene (PTFE) are mixed, in the interior of a carbon fiber base, and a fine pore layer 120 formed by coating a second slurry S2, in which carbon powder and polytetrafluoroethylene (PTFE) are mixed and which has a viscosity that is higher than the viscosity of the first slurry S1, on a surface of the base layer 110.

The base layer 110 is formed by impregnating the first slurry S1 in the interior of the base 111 including carbon fibers. Then, the base 111 is configured such that the first slurry S1, in which carbon powder and polytetrafluoroethylene (PTFE) are mixed, is impregnated in the interior of the base 111 including only the carbon fibers. Accordingly, the strength of the base layer 110 itself can be secured by filling carbon power and PTFE in pores formed between the carbon fibers.

Meanwhile, the carbon fibers used for the base 111 that constitutes the base layer 110 may be the forms of carbon fiber cloth, carbon fiber felt, and carbon fiber paper.

Further, the carbon powder that constitutes the first slurry may be one or a mixture of carbon powers including carbon black, acetylene carbon black, and black pearl carbon. In the embodiment, carbon black is used as the carbon powder.

The fine pore layer 120 is formed by coating the second slurry S2 on a surface of the base layer 110. Then, the component of the second slurry S2 is the same as or similar to the component of the first slurry S1, but the solid contents of the first slurry S1 and the second slurry S2 are different.

For example, because the first slurry S1 should be impregnated in the interior of the base 111, the viscosity of the first slurry S1 is maintained low by decreasing the solid content of the first slurry S1. Meanwhile, because the second slurry S2 is coated on the surface of the base layer 110, the viscosity of the second slurry S2 is maintained high by increasing the solid content of the second slurry S2 to enhance the function of the gas diffusion layer.

Preferably, the first slurry S1 is prepared by mixing carbon powder and polytetrafluoroethylene (PTFE) with a solvent such that the solid content of the first slurry S1 is 5% to 10% whereby the viscosity of the first slurry S1 is 10,000 cps to 100,000 cps. Further, the second slurry S2 is prepared by mixing carbon powder and polytetrafluoroethylene (PTFE) with a solvent such that the solid content of the second slurry S2 is 5% to 15% whereby the viscosity of the second slurry S2 is 100,000 cps to 500,000 cps. Then, the solvent for forming the first slurry S1 and the second slurry S2 may include isopropyl alcohol (IPA), n-propyl alcohol (NPA), and DI water. Further, a dispersion agent may further provided in the first slurry S1 and the second slurry S2 such that carbon powder and PTFE may be uniformly dispersed in the solvent.

Further, the first slurry S1 and the second slurry S2 may further include a cerium oxide that is a hydrogen peroxide decomposing catalyst. Then, the cerium oxide may be included in both of the first slurry S1 and the second slurry S2, or may be included in any one selected from the first slurry S1 and the second slurry S2.

Meanwhile, because the first slurry S1 formed of a component that is the same as or similar to the component of the second slurry S2 that constitutes the fine pore layer 120 is impregnated in the interior of the base layer 110 and the base layer 110 and the fine pore layer 120 are integrally formed by coating the second slurry S2 on the surface of the base layer 110 and forming the fine pore layer 120, the strength of the gas diffusion layer can be maintained while the thickness of the gas diffusion layer is made thin.

For example, the thickness of the base layer 110 may be 50 μm to 80 μm, and the thickness of the fine pore layer 120 may be 20 μm to 40 μm. In this way, the thickness of the base layer 110 is made thin as compared with the thickness (about 260 μm to 270 μm) of a conventional general base, but the strength of the base layer can be maintained at a desired level due to the influence of the first slurry S1 impregnated in the interior of the base layer 110 as a whole.

A method for manufacturing the above-described gas diffusion layer will be described with reference to the drawings.

The method for manufacturing the gas diffusion layer for a fuel cell according to the present disclosure includes a base preparing step of preparing a base 111 by using carbon fibers, a slurry preparing step of preparing a first slurry S1 having a relatively low viscosity and a second slurry S2 having a viscosity that is higher than the viscosity of the first slurry S1, a base layer forming step of forming a base layer 110 by impregnating the first slurry in the interior of the base 111, and a fine pore layer forming step of forming a fine pore layer by coating the second slurry on a surface of the base layer 110. Further, a sintering step of sintering carbon power and PTFE included in the first slurry S1 and the second slurry S2 through heat treatment is further provided after the fine pore layer forming step.

In the base preparing step, the base 111 is prepared by using carbon fibers as in the conventional technology. However, conventionally, a hydrophobic agent such as polytetrafluoroethylene (PTFE) is impregnated after a base 111 is prepared by using carbon fibers to make the base 111 hydrophobic, but in the present embodiment, because the base 111 is made hydrophobic by impregnating the first slurry S1 in the base layer forming step, the base 111 is not separately made hydrophobic in the base preparing step. Accordingly, the base 111 is prepared by using only carbon fibers in the base preparing step. For example, the base 111 may be the forms of carbon fiber cloth, carbon fiber felt, carbon fiber paper, and the like.

The slurry preparing step is a step of preparing the first slurry S1 and the second slurry S2 that constitute the base layer 110 and the fine pore layer 120, and the components of the first slurry S1 and the second slurry S2 are the same, but the viscosities of the first slurry S1 and the second slurry S2 are made different by making the solid contents of the first slurry S1 and the second slurry S2 different.

For example, because the first slurry S1 should be impregnated in the interior of the base 111, the viscosity of the first slurry S1 is maintained low by decreasing the solid content of the first slurry S1. To achieve this, the first slurry S1 is prepared by mixing carbon powder and polytetrafluoroethylene (PTFE) with a solvent such that the solid content of the first slurry S1 is 5% to 10% whereby the viscosity of the first slurry S1 is 10,000 cps to 100,000 cps.

Meanwhile, because the second slurry S2 is coated on the surface of the base layer 110, the viscosity of the second slurry S2 is maintained high by relatively increasing the solid content of the second slurry S2 to enhance the function of the gas diffusion layer. To achieve this, the second slurry S2 is prepared by mixing carbon powder and polytetrafluoroethylene (PTFE) with a solvent such that the solid content of the second slurry S2 is 10% to 15% whereby the viscosity of the second slurry S2 is 100,000 cps to 500,000 cps.

Then, the solvent for forming the first slurry S1 and the second slurry S2 may include IPA, NPA, and DI water. Further, a dispersion agent may further provided in the first slurry S1 and the second slurry S2 such that carbon powder and PTFE may be uniformly dispersed in the solvent.

The base layer forming step is a step of preparing the base layer 110 by impregnating the first slurry S1 in the interior of the base 111, and the first slurry S1 is impregnated in the entire area of the interior of the base 111 by applying the first slurry S1 to one surface of the prepared base 111 and suctioning the first slurry S1 from an opposite surface of the base 111.

For example, as illustrated in FIG. 4, the base 111 is moved while being uncoiled in a state in which the base 111 is prepared in the form of a roll, the first slurry S1 is supplied to the one surface of the base 111 on a movement path, along which the base 111 is moved, and the first slurry S1 supplied by a scrapper 1 is applied with a predetermined thickness. In this state, if the first slurry S1 is suctioned by using a suction device 2 provided on the opposite surface of the base, the first slurry S1 is impregnated while being dispersed into the interior of the base 111.

The fine pore layer forming step is a step of forming the fine pore layer 120 by coating the second slurry S2 prepared on the surface of the base layer 110, and the second slurry S2 is applied to the surface of the base layer 110 formed by impregnating the first slurry S1 in the interior of the base 111.

For example, as illustrated in FIG. 4, a bath 3, in which the second slurry S2 is accommodated, and a coating roll 4 installed in the bath 3 to apply the second slurry S2 accommodated in the bath 3 are disposed on a path, along which the base layer 110 formed by impregnating the first slurry S1 in the interior of the base layer 111 is continuously moved. Accordingly, a predetermined amount of the second slurry S2 is coated on the surface of the base layer 110 by the coating roll 4 while the base layer 110 is moved while being adhered to the coating roll 4.

In this way, if the fine pore layer 120 is coated on the surface of the base layer 110, carbon powder and PTFE included in the first slurry S1 and the second slurry S2 are sintered through heat treatment. Here, the heat treatment refers to heating PTFE to a melting point (about 350° C. or more) of PTFE. Accordingly, the fine pore layer 120 is sintered while the dispersion performance of PTFE included in the first slurry S1 and the second slurry S2 is enhanced. Here, sintering refers to a process of melting the PTFE particles by heating the slurry, in which carbon powder and PTFE are mixed, and uniformly dispersing the PTFE having a fluidity to the entire area of the slurry.

The gas diffusion layer according to the present disclosure, which is manufactured as described above, is effective in discharging generated water as compared with a conventional general gas diffusion layer.

The reason is that the conventional general gas diffusion layer 20, as illustrated in FIG. 2, is formed by forming a fine pore layer 22 (micro porous layer: MPL) in the base 21 including carbon fibers. Then, in order to form the fine pore layer 22, the slurry, in which carbon powder and a hydrophobic agent such as polytetrafluoroethylene (PTFE) are mixed, is applied to a surface of the base 21, and a portion of the applied slurry penetrates into the surface of the base by a predetermined depth. Accordingly, the conventional gas diffusion layer 20 should sequentially pass through three zones including a fine pore layer, a base into which the fine pore layer penetrates, and the base to discharge generated water.

However, because the gas diffusion layer 100 according to the present disclosure is configured such that the first slurry S1 is impregnated in the interior of the base layer 110, it has only to sequentially pass through two zones including a fine pore layer and a base layer, in which the first slurry is impregnated, to discharge the generated water.

In this way, the gas diffusion layer 100 according to the present disclosure can smoothly discharge the generated water by decreasing the number of the steps of the passage, through which the generated water is discharged, as compared with the conventional general gas diffusion layer 20, and decreasing resistance on the path, along which the generated water is discharged.

Further, the conventional general gas diffusion layer 20 is configured such that the carbon fibers that constitutes the base 21 form a plurality of layers, and then, the interlayers of the carbon fibers has spaces that are microscopically unoccupied. Accordingly, a medium that moves the generated water disappears in the interlayers of the carbon fibers in the thickness direction of the base 21, and thus, the generated water temporarily stays between the layers of the carbon fibers that constitute the base 21 when the generated water is discharged in the thickness direction of the base. As a result, the efficiency of the generated water, at which the generated water flows in the thickness direction of the base 21, decreases.

Meanwhile, the gas diffusion layer 100 according to the present disclosure functions as a medium for moving the generated water while the first slurry S1 is impregnated in the interlayers of the carbon fibers that constitute the base layer 110.

Accordingly, even though the generated water is discharged in the thickness direction of the base layer 110, the first slurry S1 smoothly flows as a medium while the generated water does not stay between the interlayers of the carbon fibers as in the conventional technology. As a result, the efficiency of the generated water, at which the generated water flows in the thickness direction of the base, is enhanced.

Meanwhile, the present disclosure can enhance the discharge efficiency of the generated water by forming a pattern, at which the first slurry is impregnated in the base.

Figure 5A:
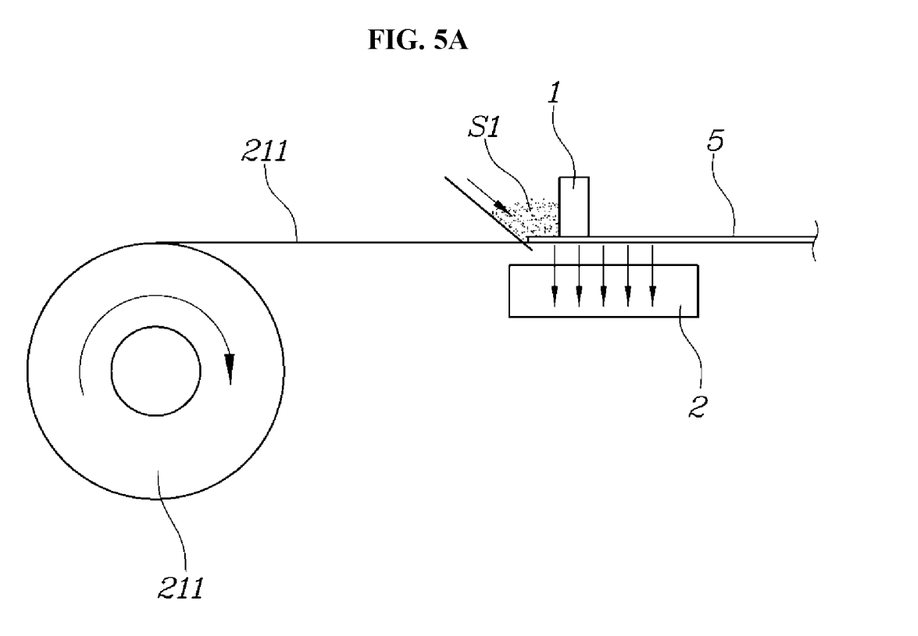
FIGS. 5A and 5B are views illustrating a process of manufacturing a gas diffusion layer for a fuel cell according to another embodiment of the present disclosure.
Figure 5B:
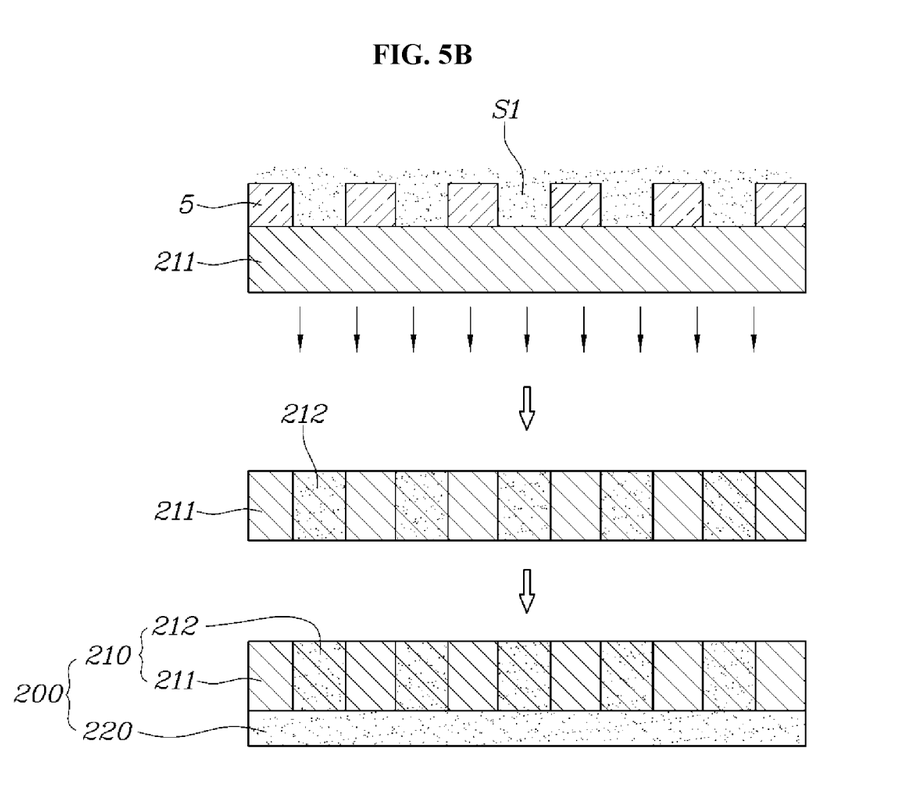
Figure 6:
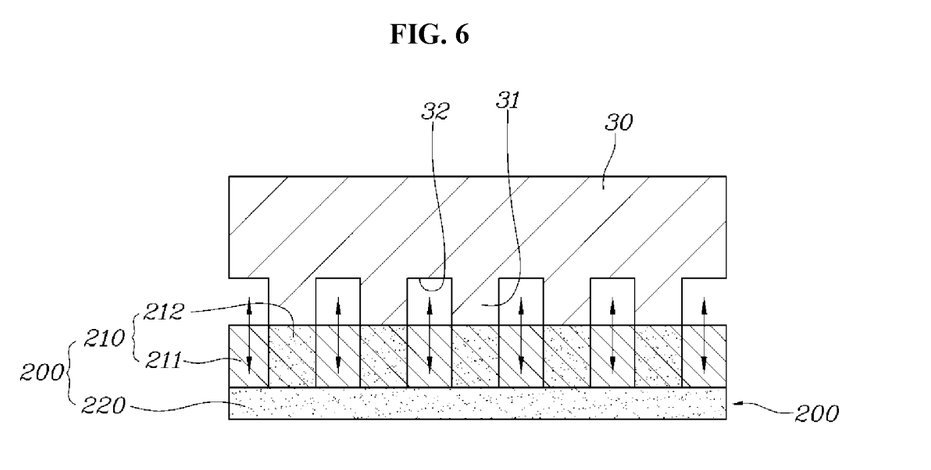
FIG. 6 is a view illustrating a lamination state of a gas diffusion layer for a fuel cell and a separator according to the another embodiment of the present disclosure.

FIGS. 5A and 5B are views illustrating a process of manufacturing a gas diffusion layer for a fuel cell according to another embodiment of the present disclosure. FIG. 6 is a view illustrating a lamination state of a gas diffusion layer for a fuel cell and a separator according to another embodiment of the present disclosure.

The gas diffusion layer 200 for a fuel cell according to another embodiment of the present disclosure includes a base layer 210 and a fine pore layer 220 similarly to the gas diffusion layer of the above-described embodiment.

Meanwhile, a predetermined pattern is defined in an area, in which the first slurry S1 is impregnated by limiting the location of the first slurry S1, in which the first slurry S1 is impregnated.

For example, as illustrated in FIG. 6, the pattern defined by impregnating the first slurry S1 in the base layer 210 is a pattern corresponding to a land 31 formed in the separator 30 that constitutes a unit cell of a fuel cell and an area of the channel 32, which faces the land 31.

Accordingly, the base layer 210 is configured such that a predetermined pattern is formed in the area 212, in which a relatively large amount of the first slurry S1 is impregnated in the base 211. Accordingly, the hydrophobicity of an area of the separator 30, which faces the land 31, can be increased by increasing the density of the area, by which the slurry S1 is impregnated, to prevent water from being accumulated at the corresponding portion. Accordingly, the generated water is made to be smoothly discharged through the channel 32 of the separator 30 by guiding the flows of the generated water to an area of the separator 30, which is opposite to the channel 32.

Meanwhile, as illustrated in FIG. 5B, the base layer 210 may be classified into an area 212, in which the first slurry S1 is impregnated while the location of the first slurry S1 impregnated in the interior of the base layer 210 is limited, and an area 211, in which the first slurry S1 is not impregnated, but the present disclosure is not limited thereto and the base layer 210 may be classified into an area, in which the first slurry S1 is impregnated in the entire area of the base layer 210 in the interior of the base layer 210 but a relatively large amount of the first slurry S1 is impregnated, and an area, in which a relatively small amount of the first slurry S1 is impregnated.

For example, the amount of the first slurry S1 impregnated in the interior of the base layer 210 may be made to be different by using a predetermined pattern, and the first slurry S1 may be classified into an over-density pattern (corresponding to 212 of FIG. 6), in which the amount of the impregnated first slurry S1 is relatively large, and a low-density pattern (corresponding to 211 of FIG. 6), in which the amount of the impregnated first slurry S1 is relatively small.

Accordingly, as illustrated in FIG. 6, the first slurry S1 may be classified into an over-density pattern and a low-density pattern similarly to the case in which the first slurry S1 is classified into the area 212, in which the first slurry S1 is impregnated, and an area 211, in which the first slurry S1 is not impregnated, and then, the over-density pattern of the pattern, in which the first slurry S1 is impregnated in the base layer 210, is a pattern corresponding to a land 31 formed in the separator 30 that constitutes a unit cell of a fuel cell and an area of the channel 32, which faces the land 31.

Accordingly, the generated water is made to be smoothly discharged through the channel 32 of the separator 30 by guiding the flows of the generated water to an area of the separator 30, which is opposite to the channel 32.

The method for manufacturing a gas diffusion layer according to another embodiment of the present disclosure as described above will be described with reference to the drawings.

The method for manufacturing a gas diffusion layer according to the another embodiment of the present disclosure, as in the above-described embodiment, includes a base preparing step, a slurry preparing step, a base layer forming step, and a fine pore layer forming step. Further, a sintering step is further provided after the fine pore layer forming step. Then, the base preparing step, the slurry preparing step, the fine pore layer forming step, and the sintering step are carried out as in the above-steps.

Further, even in the base layer forming step, the first slurry S1 is impregnated in the base 211 by applying the first slurry S1 on one surface of the base 211 and suctioning the first slurry S1 from an opposite surface of the base 211. Meanwhile, after a mask 5, in which a through-hole of a predetermined pattern is formed on the one surface of the base 211, is disposed before the first slurry S1 is applied, the first slurry S1 is applied to the surface.

Accordingly, if the first slurry S1 is suctioned from the opposite surface of the base 211, an area 212, in which a relatively large amount of the first slurry S1 is impregnated is formed to have a predetermined pattern in correspondence to the pattern of the through hole formed in the mask 5 while the first slurry S1 is impregnated in the interior of the base 211.

Then, the predetermined pattern of the through-hole formed in the mask 5 is a pattern corresponding to a land 31 formed in the separator 30 that constitutes a unit cell of a fuel cell and an area of the channel 32, which faces the land 31.

Accordingly, as illustrated in FIG. 5B, the base layer 210 is configured such that a predetermined pattern is formed in the area 212, in which a relatively large amount of the first slurry S1 is impregnated in the base 211. Then, impregnation of the first slurry S1 may be completely excluded from the other areas of the base layer 210, except for the area 212, in which a large amount of the first slurry S1 is impregnated, but a relatively small amount of the first slurry S1 may be impregnated due to the characteristics of the manufacturing process.

Meanwhile, the present disclosure may realize the gas diffusion layer while classifying the gas diffusion layer into a low-humidification gas diffusion layer and a high-humidification diffusion layer.

Figure 7A:
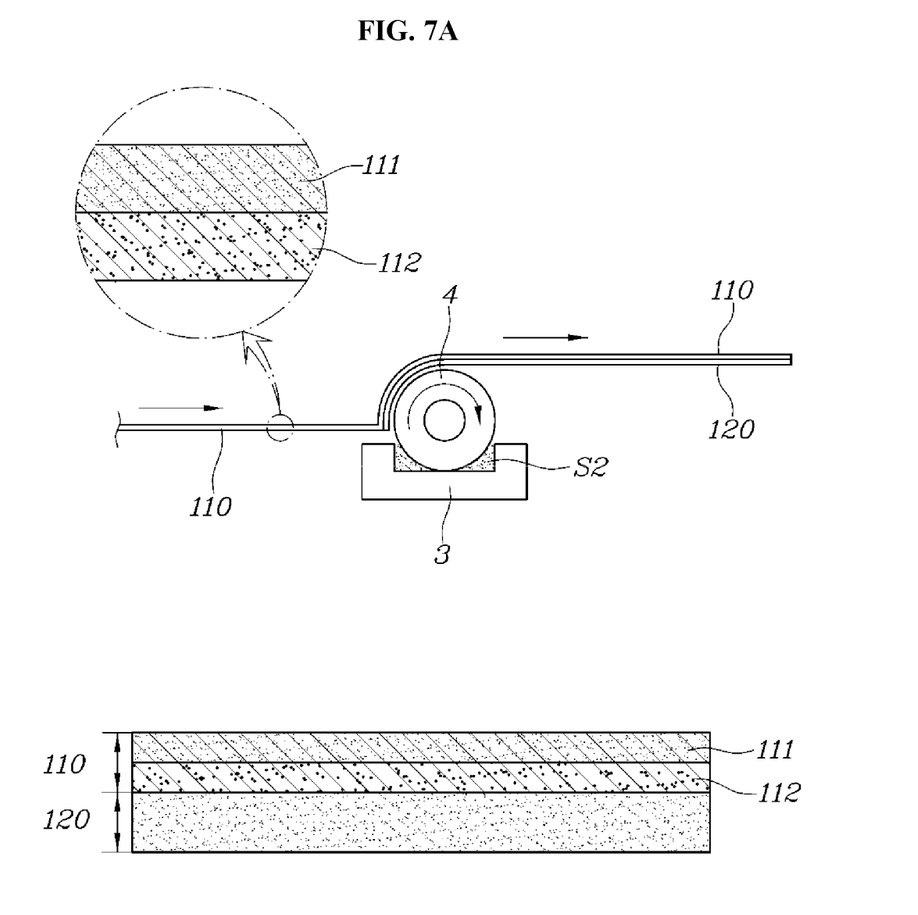
FIGS. 7A and 7B are views illustrating a gas diffusion layer for a fuel cell and a process of manufacturing a gas diffusion layer for a fuel cell according to still another embodiment of the present disclosure.
Figure 7B:
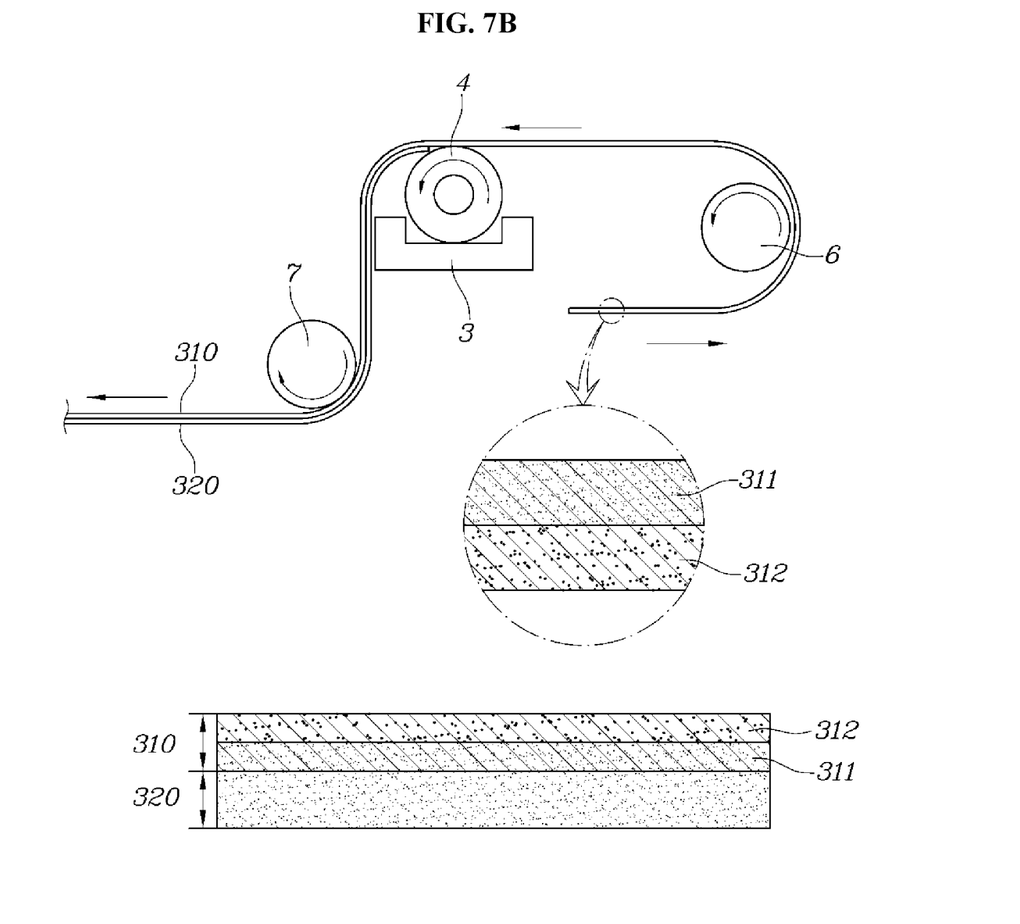

FIGS. 7A and 7B are views illustrating a process of manufacturing a gas diffusion layer for a fuel cell according to still another embodiment of the present disclosure.

Then, FIG. 7A is a view illustrating a low-humidification gas diffusion layer used in a low-humidification environment, and FIG. 7B is a view illustrating a high-humidification gas diffusion layer used in a high-humidification environment.

The gas diffusion layer according to still another embodiment of the present disclosure, as in the above-described embodiments, includes a base layer 110 and 310 and a fine pore layer 120 and 320.

Then, the base layer 110 and 310 is classified into an over-density area 111 and 311, in which the amount of the impregnated first slurry is relatively large with reference to the thickness direction of the base layer 110 and 310, and a low-density area 112 and 312, in which the amount of the impregnated first slurry is relatively small.

Accordingly, as illustrated in FIG. 7A, the low-humidification diffusion layer that is to be used in a low-humidification environment is configured such that a fine pore layer 120 is formed on a surface of the low-density area 112 formed in the base layer 110.

In order to manufacture the low-humidification gas diffusion layer, first, in the step of forming the base layer 110, a high-density area 111, in which the amount of the impregnated first slurry S1 is relatively large, is formed on the base with reference to the thickness of the base, and a low-density area 112, in which the amount of the impregnated first slurry S1 is relatively small, is formed under the base. Further, the low-density area 112 is made to be moved while facing the coating roll 4 when the base layer 110 passes through the coating roll 4 for coating the second slurry S2 to form a fine pore layer 120 in the low-density area 112 of the base layer 110.

Further, as illustrated in FIG. 7B, the high-humidification diffusion layer that is to be used in a high-humidification environment is configured such that a fine pore layer 320 is formed on a surface of the high-density area 311 formed in the base layer 310.

In order to manufacture the high-humidification gas diffusion layer, first, in the step of forming the base layer 310, a high-density area 311, in which the amount of the impregnated first slurry S1 is relatively large, is formed on the base with reference to the thickness of the base, and a low-density area 312, in which the amount of the impregnated first slurry S1 is relatively small, is formed under the base. Further, the high-density area 311 is made to be moved while facing the coating roll 4 by reversing the base layer 310, when the base layer 310 passes through the coating roll 4 for coating the second slurry S2 to form a fine pore layer 320 in the high-density area 311 of the base layer 310. In order to reverse the base layer 310 while the base layer 310 is moving, feeding rolls 6 and 7 may be disposed at a tip end and a rear end of the coating roll 4.

Although the present disclosure has been described with reference to the preferred embodiments, the present disclosure is not limited thereto and is defined by the following claims. Therefore, an ordinary person in the art to which the present disclosure pertains can variously modify and correct the present disclosure without departing from the technical spirit of the following claims.

The invention claimed is:

1. A gas diffusion layer for a fuel cell which constitutes a unit cell of the fuel cell, the gas diffusion layer comprising:
 a base layer formed by impregnating a first slurry, in which carbon powder and polytetrafluoroethylene (PTFE) are mixed, in the interior of a carbon fiber base; and
 a fine pore layer formed by coating a second slurry, in which carbon powder and polytetrafluoroethylene (PTFE) are mixed and which has a viscosity that is higher than the viscosity of the first slurry, on a surface of the base layer.

2. The gas diffusion layer of claim 1, wherein the first slurry impregnated in the interior of the base layer is impregnated in the entire area of the base layer.

3. The gas diffusion layer of claim 1, wherein the first slurry impregnated in the interior of the base layer is impregnated in the interior of the base layer to have a predetermined pattern, and
 wherein the pattern, in which the first slurry is impregnated in the base layer, is a pattern corresponding to a land formed in a separator that constitutes the unit cell of the fuel cell and an area of a channel, which faces the land.

4. The gas diffusion layer of claim 1, wherein the first slurry impregnated in the interior of the base layer is impregnated in the entire area of the base layer,
 wherein the predetermined pattern of the first slurry impregnated in the interior of the base layer is classified into an over-density pattern in which the amount of the impregnated first slurry is relatively large and a low-density pattern in which the amount of the impregnated first slurry is relatively small when the first slurry is impregnated in the interior of the base layer, and
 wherein the over-density pattern in the pattern, in which the first slurry is impregnated in the base layer, is a pattern corresponding to a land formed in a separator that constitutes the unit cell of the fuel cell and an area of a channel, which faces the land.

5. The gas diffusion layer of claim 1, wherein the base layer is classified into a high-density area, in which the amount of the impregnated first slurry is relatively large and a low-density area, in which the amount of the impregnated first slurry is relatively small with reference to the thickness direction thereof.

6. The gas diffusion layer of claim 5, wherein the gas diffusion layer for a fuel cell may be classified into a low-humidification gas diffusion layer and a high-humidification gas diffusion layer,
 wherein the low-humidification gas diffusion layer has the fine pore layer on a surface of the low-density area formed in the base layer, and
 wherein the high-humidification gas diffusion layer has the fine pore layer on a surface of the high-density area formed in the base layer.

7. The gas diffusion layer of claim 1, wherein the thickness of the base layer is 50 μm to 80 μm, and
 wherein the thickness of the fine pore layer is 20 μm to 40 μm.

8. The gas diffusion layer of claim 1, wherein the solid content of the first slurry is 5% to 10%, and
 wherein the solid content of the second slurry is 10% to 15%.

9. The gas diffusion layer of claim 1, wherein a cerium oxide is further mixed in any one or both of the first slurry and the second slurry.

10. A method for manufacturing a gas diffusion layer which constitutes a unit cell of the fuel cell, the method comprising:
 a base preparing step of preparing a base by using carbon fibers;
 a slurry preparing step of preparing a first slurry, the viscosity of which is relatively low and a second slurry, the viscosity of which is relatively high, by mixing carbon powder and polytetrafluoroethylene (PTFE);
 a base layer forming step of forming a base layer by impregnating the first slurry in the interior of the base; and
 a fine pore layer forming step of forming a fine pore layer by coating the second slurry on a surface of the base layer.

11. The method of claim 10, wherein the slurry preparing step comprises:
 preparing the first slurry by mixing carbon powder and polytetrafluoroethylene (PTFE) with a solvent such that the solid content of the first slurry is 5% to 10% whereby the viscosity of the first slurry is 10,000 cps to 100,000 cps; and preparing the second slurry by mixing carbon powder and polytetrafluoroethylene (PTFE) with a solvent such that the solid content of the second slurry is 10% to 15% whereby the viscosity of the second slurry is 100,000 cps to 500,000 cps.

12. The method of claim 10, wherein the base preparing step comprises:

preparing the base by using only the carbon fibers, and wherein the base layer forming step comprises:

impregnating the first slurry in the entire area of the interior of the base by, after applying the first slurry on one surface of the base, suctioning the first slurry from an opposite surface of the base.

13. The method of claim 12, wherein the base layer forming step comprises:

forming the base layer such that the base layer is classified into a high-density area, in which the amount of the impregnated carbon powder is relatively large and a low-density area, in which the amount of the impregnated carbon powder is relatively small with reference to the thickness direction thereof, by adjusting the amount of the suctioned first slurry.

14. The method of claim 13, wherein the gas diffusion layer for a fuel cell may be classified into a low-humidification gas diffusion layer and a high-humidification gas diffusion layer, wherein the fine pore layer forming step comprises:

when the low-humidification gas diffusion layer is manufactured, forming the fine pore layer by coating the second slurry on a surface of the low-density area formed in the base layer; and when the high-humidification gas diffusion layer is manufactured, forming the fine pore layer by coating the second slurry on a surface of the high-density area formed in the base layer.

15. The method of claim 10, wherein the base preparing step comprises:

preparing the base by using only the carbon fibers, wherein the base layer forming step comprises:

after disposing a mask having a through-hole of a predetermined pattern on one surface of the base, applying the first slurry on the surface of the base, and impregnating the first slurry in the interior of the base in a predetermined pattern by suctioning the first slurry from an opposite surface of the base, and wherein the predetermined pattern formed in the mask is a pattern corresponding to a land formed in a separator that constitutes the unit cell of the fuel cell and an area of a channel, which faces the land.

16. The method of claim 10, further comprising:

after the fine pore layer forming step, a sintering step of sintering carbon powder and polytetrafluoroethylene (PTFE) included in the first slurry and the second slurry through heat treatment.

* * * * *